United States Patent [19]

Peaster

[11] 4,113,061
[45] Sep. 12, 1978

[54] AUTOMATIC LUBRICATOR

[75] Inventor: Bertram Anthony Peaster, Marietta, Ga.

[73] Assignee: Lockheed Corporation, Burbank, Calif.

[21] Appl. No.: 759,756

[22] Filed: Jan. 17, 1977

[51] Int. Cl.² .................. F16N 11/04; F16N 11/10
[52] U.S. Cl. .................................. 184/41; 184/1 D; 184/45 R
[58] Field of Search ............... 184/45 R, 45 A, 41, 184/39, 1 D, 55 R

[56] References Cited

U.S. PATENT DOCUMENTS

| | | | |
|---|---|---|---|
| 1,160,593 | 11/1915 | Graham | 184/39 |
| 1,465,620 | 8/1923 | Anderson | 184/39 |
| 1,628,833 | 5/1927 | Frank | 184/45 R X |
| 1,989,451 | 1/1935 | Hull | 184/45 R |
| 2,403,397 | 7/1946 | Rankin | 184/45 R X |
| 2,498,090 | 2/1950 | MacIndoe | 184/45 R |
| 2,859,598 | 11/1958 | Hochreuter | 184/45 R X |
| 3,210,137 | 10/1965 | Williams | 184/45 A X |
| 3,951,234 | 4/1976 | Fisher | 184/41 X |

Primary Examiner—David H. Brown
Attorney, Agent, or Firm—John J. Sullivan

[57] ABSTRACT

This automatic lubricator is an adaption of sound hydraulic principle, that is the application of lubricant over a sustained time period by pressure in the lubricant. The novel feature is that the design permits readily available pressure from a service gun to be directly responsible for the pressure application, which is then trapped in the device, and made to feed out slowly to the surfaces requiring lubrication. Also, included in the preferred form of the device is a gage to indicate visually the quantity of lubricant within the device.

4 Claims, 3 Drawing Figures

AUTOMATIC LUBRICATOR

This invention relates to lubricators generally and more particularly to an automatic lubricator especially designed and adapted for incorporation in mounting bolts requiring lubrication to avoid excessive wear due primarily to corrosion.

It has been found that the life of structural mountings is substantially increased by maintaining them constantly lubricated to prevent the admission of moisture at the joint between the structural members, i.e., around the bolt and the connected parts. This is especially true in such mountings which are subjected to dynamic loads which cause vibration and relative movement across the joint.

The practice, therefore, has developed of periodically lubricating such joints and parts, the frequency of such lubrications depending upon the particular installation and operation. In some installations access to the parts is difficult or even impossible causing frequent overhaul and/or repair. Also, with some installations it is not easy or possible to perform the required lubrication in a timely manner such as while the equipment or machine is operating.

For example, in mountings on aircraft, the mounting bolt or bolts which connect structural members to the airframe or to major components of the aircraft, are subjected to appreciable loads associated with strong tendencies to movement between the structural members and the aircraft. At the same time the high tensile/low chromium steels necessary to take the heavy loads are very susceptible to corrosion. Visual inspection of these bolts to assure lubrication is often impossible without disassembly and the best maintenance, therefore, is considered to be frequent manual lubrications. Obviously, lengthy service of the aircraft prevents this maintenance on occasion and also where quick turn-around of the aircraft is required such niceties are not always affordable. Even then there is always the possibility of human error or omission. In any event the total result is that the life of the installation is shortened.

The present invention has the foregoing and other installations and operations in view and proposes an automatic lubricator which, when incorporated in the assembly it services constitutes an integral part thereof. This lubricator comprises essentially a chamber adapted to contain the selected lubricant, a filler inlet to the chamber and a power actuated piston to force lubricant from the chamber through one or more strategically located outlets adjacent the area to be treated. As an added feature, a gage is included though not necessarily essential which indicates visually the level of the lubricant in the chamber at all times to facilitate filling and to notify when refill is necessary.

The automatic replenishment of lubricant under pressure as herein proposed offers important improvements to existing schemes in that the lubricant is not only delivered to the critical area but as it is expended new lubricant is assured of reaching the critical area. This is particularly important since in prior systems which offer a reserve of lubricant such replenishment lubricant is not in the precise area where needed and has no positive means to conduct its continued passage to the precise area.

At the same time since most of the expenditure of lubricant from the critical area occurs during operation, i.e., when there is relative movement of the adjacent parts the replenishment will be taking place only at this time. This is particularly true in the case of aircraft where replenishment will be occurring during flight and at altitude where the lower temperature will cause the lubricant to thicken and without the inherent pressure herein contemplated the flow of lubricant to the critical area will not take place.

With the above and other objects in view as will be apparent this invention consists in the construction, combination and arrangement of parts all as hereinafter more fully described, claimed and illustrated in the accompanying drawings herein:

Figure 1:
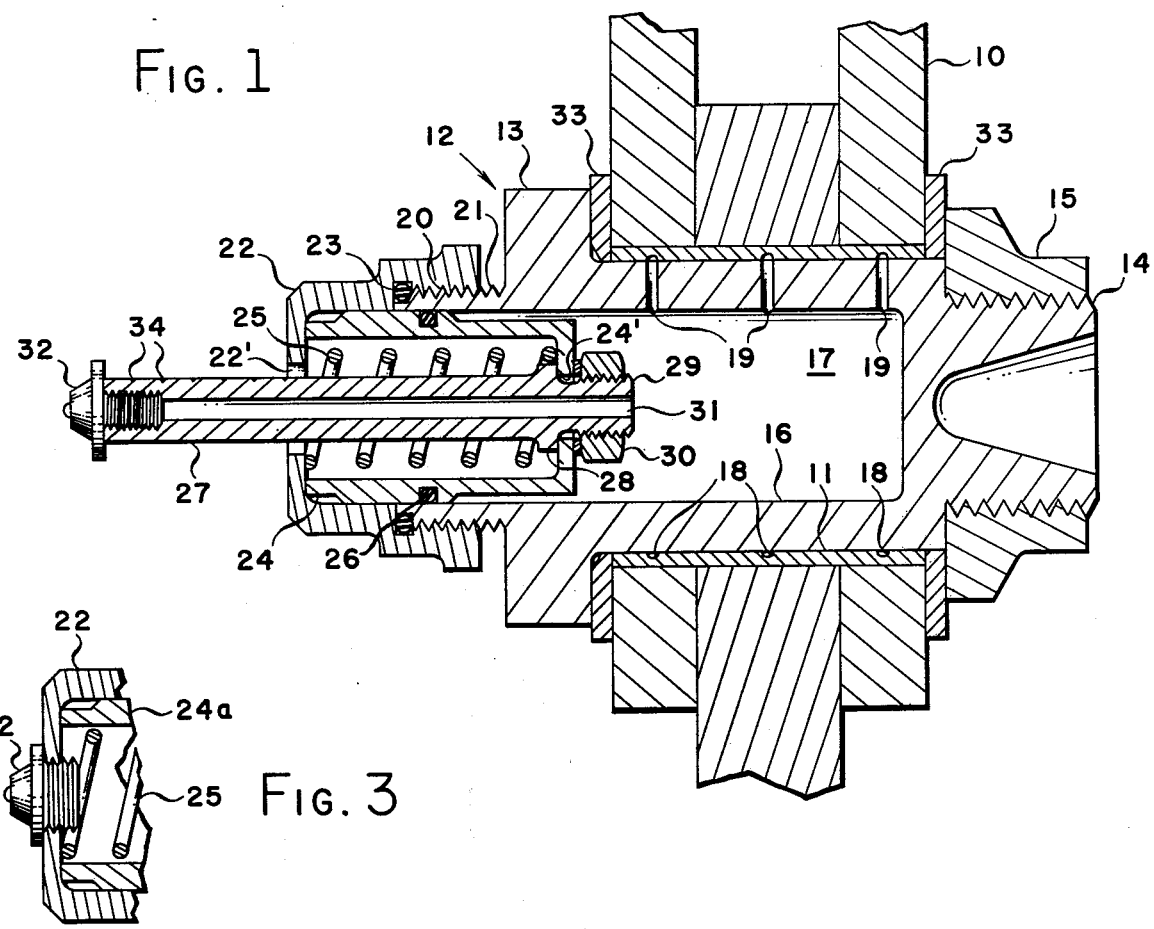
FIG. 1 is a sectional view taken through a typical mounting installation showing a plurality of structural members interconnected by a bolt incorporating an automatic lubricator constructed in accordance with the teachings of this invention, only the adjacent portions of the structural members being shown.

Referring more particularly to the drawings and specifically FIG. 1, 10 represents a typical mounting pierced by a hole lined with a bushing 11. A bolt 12 formed at one end with a head 13 is sized to pass through and fill the bushing 11 terminating at its other end in external threads 14 adapted to receive a nut 15. The bolt 12 thereby secures the mounting 10 against all relative movement. The faying surfaces of the bolt 12 and bushing 11 define a critical area subject to undue wear primarily because of corrosion unless protected, as for example, by constant lubrication.

To this end the bolt 12 is bored axially as at 16 producing an internal chamber 17 to receive and contain an appropriate lubricant. The inner surface of the bushing 11 adjacent the critical area is formed or otherwise provided with at least one and preferably a plurality of grooves 18 each in communication with the chamber 17 by means of and through a transverse passage 19.

At its head end the bolt 12 is provided with an extension 20 which is externally threaded, as at 21, to receive an end nut or cap 22 with an appropriate seal 23 therebetween. Internally the extension 20 and cap 22 define surfaces which align with and form a smooth and uninterrupted continuation of the bore 16 of the bolt 12 when the cap 22 is fully tightened on the extension 20. A piston 24 is mounted for reciprocation within the bore 16 being in the form of a cup open at its end adjacent the cap 22 in order to accommodate a pressure producing device such as a compression spring 25 tending always to move the piston 24 to the other end of the bolt 12 i.e., toward the nut 15. One or more O-ring seals 26 or the equivalent are provided around the piston 24 following conventional practice.

The end cap 22 and the base of the piston 24 are pierced by aligned holes 22' and 24', respectively, which are located concentrically about the center line of the bolt 12. A rod 27 passes through the holes 22' and 24' and terminates in an enlarged shoulder 28 adapted to abut the inner base of the cup 24 and a threaded extension 29 which passes through the hole 24' and receives a nut 30. The rod 27 and piston 24 thereby constitute, in effect, an integral unit.

The length of the rod 27 is substantially equal to the aggregate length of the bore 16, extension 20 and cap 22 when assembled whereby the outer end thereof terminates substantially in the plane of the outer surface of the cap 22 when the rod 27 is fully inserted into the chamber 17. Internally, the rod 27 is bored axially as at 31 whereby it is in open communication with the chamber 17 at all times. At its outer end the rod 27 is threaded internally, being thereby adapted to receive a schraeder-type valve 32. The lubricant is thus injected into the chamber 17 through the rod 27 and confined therein by the valve 32, its only escape being through the passages 19 and grooves 18 into the critical area defined by the faying surfaces of the bushing 11 and bolt 12.

In operation, the lubricant or grease is injected by a standard pressure device or gun through the valve 32 whereby it completely fills the rod bore 31, chamber 17, passages 19, grooves 18 and the entire critical area defined by the bolt 12 and bushing 11. End rings or washers 33 around the bolt 12 at each end of the mounting 10 serve not only to secure the mounting 10 on the bolt 12 but also to contain the lubricant or grease within the critical area. Such containment is facilitated by the viscosity of the grease itself which as is customary, is relatively thick or thixotropic. It is expected that in surface operating equipment and machinery as opposed to aircraft, submarine, etc., the viscosity of the grease used will be greater since it will tend to thin under heat conditions, whereas in the other applications a comparatively thinner grease will be used because it will thicken at the colder temperatures of different altitudes.

During operation of the equipment or machinery and especially the relative movement of the mounting 10 and bolt 12 due to vibration, chatter and the like there will be a migration of the grease in the critical area. As this occurs or as the grease is otherwise spent, replenishment thereof occurs due to the near constant pressure being applied by the normal action of the spring-loaded piston 24 in the chamber 17. Grease within the chamber 17 is thereby forced out through each passage 19 and into its associated groove 18.

The rod 27 is especially designed and constructed to indicate at all times the contents of grease within the chamber 17. When the chamber 17 is filled the grease within the chamber 17 forces the piston 24 and rod 27 in the direction of the cap 22 whereby the rod 27 is forced to project outwardly as shown in FIG. 1. As the grease is used and the chamber 17 becomes depleted the piston 24 and rod 27 are forced as a unit inwardly under the normal action of the spring 25 now free to move and the length of rod projection beyond the cap 22 is shortened. If desired the periphery of the rod 27 may be marked or calibrated, as at 34, for a more precise reading.

Figure 2:
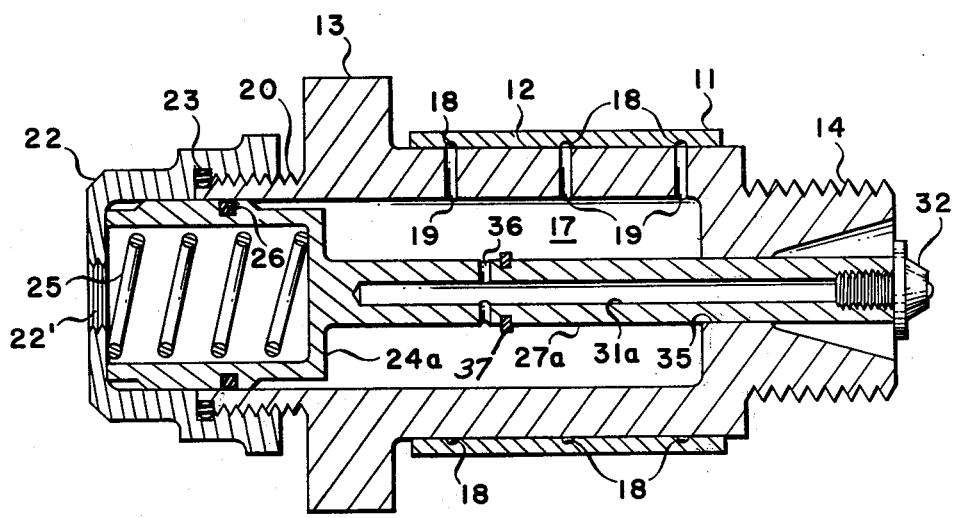
FIG. 2 is a similar view of a slightly modified form of automatic lubricator to permit access thereto from the opposite end of the bolt, where desired.

Referring more specifically to FIG. 2 a modified form of bolt 12 is shown, the only difference being a reversal of position of the rod 27 to extend from the opposite end of the piston 24$^a$. In this case the rod 27$^a$ is integral with or otherwise secured to the base wall of the piston 24$^a$ and extends therefrom passing through a passage 35 cut through the threaded end 14 of the bolt 12. If desired or required an appropriate seal may be employed in the wall of the bolt 12 which defines this passage 35. The rod 27$^a$ is bored axially, as at 31$^a$, from its outer end to a point short of its connection with the piston 24$^a$ and a transverse opening 36 through the rod 27$^a$ proximate the inner end of said bore 31$^a$ permits the flow of lubricant or grease into the chamber 17. A stop 37 is provided on the rod 27$^a$ adjacent the opening 36 to limit the extension of the rod 27$^a$ outwardly of the bolt 12 and thereby assure the location of the opening 36 within the chamber 17 at all times.

In the FIG. 2 arrangement the total piston 24$^a$ and rod 27$^a$ length is approximately equal to the length of the end cap 22 (when assembled on the extension 20), the chamber 17 and the threaded bolt end 14. Thus, when the chamber 17 is filled with grease the rod 27$^a$ is fully within the bolt 12 as opposed to extending therefrom as is the case of the FIG. 1 arrangement. Visual inspection is accomplished by noting the length of the rod 27$^a$ projecting beyond the bolt end 14 instead of the length of the rod 27$^a$ inserted into the bolt 12 as previously described.

Figure 3:
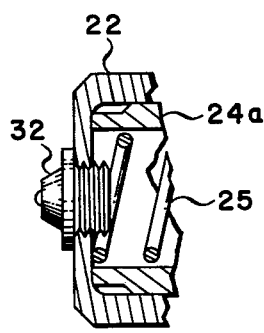
FIG. 3 is a detail to show a modification of the automatic lubricator of FIG. 2.

In instances where higher grease pressures are necessary, the spring end of the assembly can further be pressurized by fluid pressure applied through hole 22' in the end cap 22. Such fluid pressure would either replace or supplement the spring force, the latter being preferred, to provide higher return pressure on the piston 24$^a$. The detail, FIG. 3, shows how the simple addition of a valve, similar in all respects to the valve 32 can be incorporated in the end cap 22 to pressurize or additionally pressurize the piston 24$^a$.

While the invention has been hereinabove illustrated and described in what is believed to be its best and most practical form under present day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. An automatic lubricator to provide a lubricant to faying surfaces of relatively moving structural members interconnected by a mounting bolt comprising:

a chamber in the form of an axial bore in said bolt adapted to contain the selected lubricant;

an inlet to said chamber including a one-way valve to permit the filling of said chamber with said lubricant and its retention therein;

at least one passage between said chamber and the faying surfaces aforesaid;

a piston in the form of a cup opening adjacent the head end of said bolt slideable in said chamber and being normally forced to one end thereof by the lubricant acting against one side of said piston;

a rod connected to and extending from said piston through said bolt, said rod being bored axially constituting the inlet aforesaid; and pressure producing means constantly operative on and against the other side of said piston tending to move it to the other end of said chamber against the resistance therof by the lubricant.

2. The lubricator of claim 1 wherein said pressure producing means includes a compression spring.

3. The lubricator of claim 1 wherein said pressure producing means includes a one way valve associated with the open end of the cup aforesaid adapted to admit and contain pressurized fluid therein.

4. The lubricator of claim 1 wherein said rod is bored axially from its outer end to a point short of its connection with said piston and includes a transverse opening proximate its inner end in communication with said.

* * * * *